Patented Dec. 5, 1944

2,364,473

UNITED STATES PATENT OFFICE 2,364,473

DYES OF THE ANTHRAQUINONE SERIES

Melvin A. Perkins and David X. Klein, Wilmington, Del., assignors to E. I. du Pont de Nemours & Company, Wilmington, Del., a corporation of Delaware No Drawing. Application February 13, 1943, Serial No. 475,810

4 Claims. (Cl. 260—374)

This invention relates to dyes of the anthraquinone series, and more particularly to the preparation of anilinoanthraquinone sulfonic acids and their alkali metal salts, which carry a —CH$_2$CN group directly attached to the benzene nucleus.

Because of the strong affinity of many dyes of the anthraquinone wool dye series for wool and related animal fibers, it is difficult to apply them to these fibers when woven into piece goods, because the resulting dyeings are uneven due to the mechanical difficulty of obtaining an absolutely uniform distribution of the dye throughout the goods. Many of the anthraquinone acid wool dyes therefore must be applied, particularly to wool, prior to the weaving of the fabric, such as on the yarns or on the raw stock prior to spinning. Since there is considerable waste in the application of such dyes to the raw stock, and also to the skeins to a lesser extent, it is usually preferred when possible to apply the dyes to the final knitted or woven fabrics, provided suitable methods for producing satisfactory dyeings can be devised. Considerable difficulty has been experienced in obtaining blue wool dyes of the anthraquinone acid wool series which can be applied to wool goods in the piece in absolutely uniform and even shades.

It is therefore an object of this invention to prepare wool dyes of the 1-amino-4-phenylamino-2-anthraquinone sulfonic acid class which carry directly attached to the phenyl group the —CH$_2$CN radical, and which dye wool in level shades which exhibit good transfer properties as well as good fastness to light.

We have found that by introducing the —CH$_2$CN group in the phenyl radical of the class of anthraquinone acid wool dyes prepared from what is generally referred to as "bromamine acid," dyes can be obtained which dye wool in the piece goods in level shades, and which exhibit good fastness properties. The new dyes containing this radical group are produced by condensing "bromamine acid" (1-amino-4-bromo-2-anthraquinone sulfonic acid) with anilino compounds which carry the —CH$_2$CN group directly attached to the phenyl nucleus.

The following examples are given to illustrate the invention. The parts used are by weight.

Example 1

A mixture of 42.8 parts of 1-amino-4-bromo-2-anthraquinone sodium sulfonate and 33.6 parts of sodium bicarbonate is added to a solution of 50.5 parts of p-aminophenylacetonitrile hydrochloride in 570 parts of water, and then neutralized with 11 parts of soda ash. After adding 0.6 part of CuSO$_4$.5H$_2$O the mixture is heated at 75° C. for 12 hours. The aqueous solution is decanted from the oily product. The latter is boiled with 1000 parts of water and salted out with 2% KCl. Upon cooling, the crystalline product is filtered off, redissolved in 1000 parts of hot water, and treated with 10 parts of charcoal. After filtration from the insoluble residue, the clear filtrate is salted out with 1% KCl. After filtering and drying, the 1-amino-4-(4'-cyanomethylphenylamino)-2-anthraquinone sodium sulfonate is obtained which dyes wool pure blue level shades of good fastness to light.

Example 2

A mixture of 4.23 parts of 1-amino-4-bromo-2-anthraquinone-sodium sulfonate, 3.96 parts of m-aminobenzylcyanide, 3.32 parts of sodium bicarbonate, 45 parts of water and 0.1 part of copper sulfate are heated at 75° C. for 12 hours. After cooling, the crystals are filtered off and washed with 5% brine. They are then boiled with 400 parts of water containing 2 parts of charcoal, filtered hot and the filtrate salted with 4% of NaCl. After cooling, the crystals of 1-amino-4-(3'-cyanomethylphenylamino)-2-anthraquinone sodium sulfonate are filtered, washed with 3% brine, and dried. This product dyes wool level blue shades of good transferring quality and fastness to light.

Example 3

By substituting 4.38 parts of 2-methyl-5-amino-phenyl-acetonitrile for the amine in Example 2 and working in an identical manner, the 1-amino-4-(4'-methyl-5'-cyano-methylphenylamino)-2-anthraquinone sodium sulfonate is obtained which dyes wool in level blue shades of good light fastness and fulling fastness.

Any of the amino compounds of the benzene series which would normally react with "bromamine acid" and which contain the —CH$_2$CN group may be substituted for those specifically employed in the above examples, to give dyes which dye in more level shades than those of otherwise similar chemical constitution which do not contain the —CH$_2$CN group. We have found that the amino-benzyl cyanides or amino-phenyl-aceto-nitriles are more reactive in their condensation with "bromamine acid" than cyano arylamine compounds that do not contain the intervening —CH$_2$ group. This permits the dyes to be produced readily and in good yields.

The condensation may be carried out in the customary manner generally employed in the preparation of dyes of this class, preferably at temperatures of from 60° to 100° C. Acid binding agents such as potassium carbonate, sodium carbonate, or, in some cases, sodium acetate, may be employed. Other alkali metal salts of the "bromamine acid" may be used in place of the sodium salt. These variations are those which have been recognized in the preparation of dyes from the "bromamine acid" series. The resulting dye molecule may carry other substituents which have been recognized in the art as giving desirable color modifications or other desirable dyeing properties, this invention being directed primarily to increasing the level dyeing properties of dyes of this particular series by the modification in the nuclear structure as above described, namely, by introducing into the phenyl group the —CH$_2$CN radical.

We claim:

1. Dyes of the anthraquinone acid wool series which dye wool and other animal fibers in blue shades, and which exhibit good level dyeing properties, being compounds of the group consisting of 1-amino-4-phenylamino-2-anthraquinone sulfonic acid alkali metal salts and 1-amino-4-tolylamino-2-anthraquinone sulfonic acid alkali metal salts, which compounds carry as a substituent in the phenyl group the radical —CH$_2$CN.

2. 1 - amino-4-(4'- cyanomethylphenylamino)-2-anthraquinone alkali metal sulfonate.

3. 1 - amino-4-(3'-cyanomethylphenylamino)-2-anthraquinone alkali metal sulfonate.

4. 1-amino-4-(4'-methyl-5'-cyanomethylphenylamino)-2-anthraquinone alkali metal sulfonate.

MELVIN A. PERKINS.
DAVID X. KLEIN.